Figures 1A, 1B:
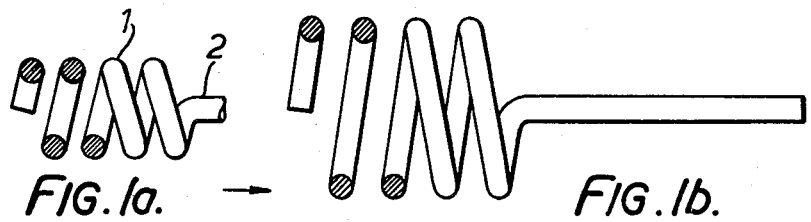

United States Patent [19]

Allen et al.

[11] 4,221,457
[45] Sep. 9, 1980

[54] COIL CONNECTOR

[75] Inventors: Leslie J. Allen, Sevenhampton, Nr. Swindon; Robert L. Hall, Swindon; Richard J. Penneck, Lechlade, all of England

[73] Assignee: Raychem Limited, London, England

[21] Appl. No.: 870,140

[22] Filed: Jan. 17, 1978

[30] Foreign Application Priority Data

Jan. 24, 1977 [GB] United Kingdom ............... 2715/77

[51] Int. Cl.$^2$ ..................... H01R 11/04; H01R 11/06
[52] U.S. Cl. ............................. 339/275 R; 29/447; 174/DIG. 8; 339/DIG. 1
[58] Field of Search ............... 339/30, 256 R, 256 S, 339/275 R, 275 T, DIG. 1; 29/447, 423, 446; 228/135, 138, 254; 174/84, DIG. 8; 285/381; 403/273

[56] References Cited

U.S. PATENT DOCUMENTS

| | | | |
|---|---|---|---|
| 317,887 | 5/1885 | Thompson | 339/256 S |
| 2,258,836 | 10/1941 | Willner | 228/254 |
| 2,772,404 | 11/1956 | Peters | 339/256 S |
| 2,792,560 | 5/1957 | Bollmeier | 339/256 S |
| 2,972,657 | 2/1961 | Stemke | 339/275 R |
| 3,234,630 | 2/1966 | Kenyon | 29/423 |
| 3,247,315 | 4/1966 | Miller | 339/275 R |
| 3,267,409 | 8/1966 | Horwitz | 339/275 R |
| 3,273,226 | 9/1966 | Brous et al. | 29/423 |
| 3,355,202 | 11/1967 | Shannon | 403/267 |
| 3,440,333 | 4/1969 | Blomstrand | 339/256 S |
| 3,513,429 | 5/1970 | Helsop | 285/381 |
| 3,616,532 | 11/1971 | Beck | 339/17 C |

FOREIGN PATENT DOCUMENTS

| | | |
|---|---|---|
| 2615683 | 10/1976 | Fed. Rep. of Germany . |
| 2533023 | 2/1977 | Fed. Rep. of Germany . |
| 493677 | 10/1938 | United Kingdom . |
| 644508 | 10/1950 | United Kingdom . |
| 715872 | 9/1954 | United Kingdom . |
| 786879 | 11/1957 | United Kingdom . |
| 786880 | 11/1957 | United Kingdom . |
| 889207 | 2/1962 | United Kingdom . |
| 1062870 | 3/1967 | United Kingdom . |

*Primary Examiner*—Neil Abrams
*Attorney, Agent, or Firm*—Lyon & Lyon

[57] ABSTRACT

Electrical connections to line substrates, such as cables, are made by employing a radially shrinkable coil member which is positioned about the substrate in an expanded form and is then caused or allowed to revert to a smaller radius so that it grips the substrate. In preferred embodiments the coil member is made from a heat-recoverable material or is made from a resilient material which is held in an expanded form by a disburdenable material, e.g. a fusible material such as solder, which is subsequently removed, deformed or destroyed so as to cause connection. The devices are especially suitable for connecting earth leads to the sheaths of mineral insulated cables in the vicinity of terminations and splices thereof.

24 Claims, 5 Drawing Figures

COIL CONNECTOR

This invention relates to methods of making connections, especially electrical connections and devices for use in such methods.

Many attempts have been made to provide connectors for substrates such as, for example, electrical conductors, which do not require crimping or other mechanical deformation of the conductors. For example, in U.S. Pat. No. 3,247,315 there is described a connector which comprises a tubular member capable of constricting about itself, which consists of a piece of resilient sheet material which has been rolled to a tubular shape. In one embodiment the tubular member is retained in a radially expanded condition by means of an internal tube or plug of solder. In use, the connector is positioned about a pair of wires and heated so that the solder melts and the tubular member constricts about itself, thereby gripping and holding the electrical conductors. This arrangement suffers from the disadvantage that the internal diameter of the tubular member is reduced by the presence of the solder tube or plug, and thus the tubular member is required to have a relatively large degree of resilient recovery to compensate for the thickness of the solder tube or plug.

British Pat. No. 1,062,870 describes a heat-recoverable article in which the recoverable component is a resilient member in tubular form, the tube being circumferentially interrupted to permit changes in the radius thereof, and being retained in an expanded configuration by a fusible member which is positioned at least partly in the path of recovery of the recoverable member. When the fusible member is raised to a temperature at which it is insufficiently rigid to retain the resilient member in its expanded form, the recoverable member contracts and thereby urges at least some of the material of the fusible member in the direction of recovery. Such an article also requires a relatively large degree of recovery on the part of the resilient member to compensate for the thickness of the fusible member.

In forming terminations and splices in mineral insulated electric cables, it is desirable, and is becoming increasingly necessary in order to conform with official regulations, to provide an earth connection to the sheath of the cable. Mineral insulated electric cables consist of one or more conductors surrounded by a sheath, usually of copper or aluminium, and having insulation material comprising a powdered mineral, for example magnesium oxide. The terminations and splices are usually covered by a sleeve of heat-recoverable material to exclude moisture from the insulation material, for example as described in British Pat. No. 1,098,304. It has been proposed in British Pat. No. 1,428,134 to provide a device for both sealing and effecting an earth connection for a cut back end of a mineral insulated cable in which the earth connector is urged into contact with the copper sheath of the cable by means of the heat-recoverable sleeve. However such a connection is mechanically weak because the only force tending to retain the connector in contact with the sheath is the recovery force of the heat-recoverable sleeve. There is thus a need for an earth connector for a mineral insulated cable which does not require crimping (which might damage the insulation of the cable), which provides a strong mechanical contact with the sheath together with a low contact resistance, and which is small enough to be contained within the heat-recoverable sleeve used in terminating or splicing the cable.

U.S. Pat. No. 3,355,202 discloses a terminating device for a linear body such as a fibrous glass cable, which device comprises a coil spring member secured therein but it is expressly stated in that Patent that the terminating device acts to secure itself to the fibrous glass cable by molecular adhesion and it is further expressly stated that no compressive forces are exerted by the device on the cable.

The present invention is based upon our observation that an especially effective and simple electrical connection to a line substrate can be made by using a radially shrinkable coil member as a connection device.

The present invention accordingly provides a method of forming an electrical connection to a substrate, wherein the substrate is positioned within a radially dimensionally-recoverable coil member and wherein the coil member is caused to recover to form the connection, there being no restraining member positioned in the direction of recovery.

The present invention is especially suitable for connecting earth leads to the sheaths of mineral insulated cables and will, for convenience, from now on be described by reference to such an application. However, it will be appreciated that it is applicable to the formation of electrical connections to other line substrates, which need not, of course, be of circular cross-section.

In one simple form of the present invention the coil member is resilient and is placed longitudinally about the cable in a radially expanded form in which it is held by mechanical restraining means such as a hand tool and the restraint is then removed to allow the coil member to recover to a smaller radius so that it contracts and tightly grips the cable. For example, the coil member may be made from a resilient material, preferably a metal, especially an electrically conductive metal such as a beryllium-copper alloy. Such a member may be produced, from a metal wire or rod, which may have any suitable cross-section, by forming the wire or rod into the shape of a helical coil. For example, the member may be formed as a tension spring and may be effectively radially expanded, for example by longitudinal compression or by an unwinding deformation, and is placed in this form about the exposed cable sheath, for example, by using a transfer mandrel, and allowed to spring back to its original form whereupon it tightly grips the sheath of the cable to form the desired connection.

In preferred embodiments of the present invention, however, the coil member is positioned about the cable in a radially expanded, but temporarily stable, form. For example the coil member may be formed from a heat-recoverable material. As is known, members made from heat-recoverable materials may be deformed from an original configuration and will retain the deformed configuration until they are heated, when they recover towards their original configuration. Amongst such materials there may be mentioned, for example, the polymers, such as cross-linked polyolefins described in U.S. Pat. Nos. 2,027,962 and 3,086,242. These polymers may, if desired, be filled with conductive materials and-/or be coated with a thin film of metal in order to make them electrically conductive.

More recently, certain metal alloys have been found to exhibit memory properties. Amongst such alloys there may be mentioned, for example, various alloys of titanium and nickel which are described, for example in U.S. Pat. Nos. 3,174,851, 3,351,463, 3,753,700, 3,759,552, British Pat. Nos. 1,327,441 and 1,327,442 and NASA Publication SP 110, "55-Nitinol-The Alloy with a Memory, etc." (U.S. Government Printing Office, Washington, D.C. 1972). The property of heat-recoverability has not, however, been solely confined to such titanium-nickel alloys. Thus, for example, various beta-brass alloys have been demonstrated to exhibit this property in, e.g. N. Nakanishi et al, *Scripta Metallurgica* 5, 433–440 (Pergamon Press 1971) and such materials may be doped to lower their transition temperatures to cryogenic regimes by known techniques. Similarly, 304 stainless steels have been shown to enjoy such characteristics E. Enami et al, id, at pp. 663–68.

In general these metals have a transition temperature within the range of from −196° C. to +135° C., especially from −196° C. to −70° C. (this being the lowest temperature they are liable to encounter during everyday use), and thus may be brought into their martensitic state by immersion in liquid nitrogen.

However, more recently, it has been found possible to "precondition" memory metals so as transiently to raise their transition temperature. This enables the articles made from such alloys to be kept at room temperature prior to use, when they can be recovered by heating. Such preconditioning methods, which eliminate the need for liquid nitrogen during storage and transportation, are described, for example in German Applications Nos. OS 2,603,911 and OS 2,603,878.

In accordance with the present invention, the coil member may be made, for example, from a filled or coated heat-recoverable plastics material or, preferably, from a memory alloy such as a brass alloy and is placed in a radially expanded deformed configuration about the cable sheath. It is then warmed or allowed to warm so that it recovers and shrinks to grip the cable sheath. The earth lead is preferably formed as an integral part of the coil member.

It has previously been proposed in German Offenlegunsschrift No. 2 615 683 to form a heat-recoverable memory metal member in the form of a coil and it has also been proposed to use such a member as part of a device to form a connection between, for example, pipe lines. However, in accordance with the teachings of German Offenlegunsschrift 2 615 683 the heat-recoverable coil is positioned about a sleeve which separates the coil from the substrate and acts to restrain the recovery of the coil. There is no suggestion of using the coil member per se to form an electrical connection as in accordance with the present invention.

In other preferred forms of the present invention the coil member may be made from a resilient material and may be held in a radially expanded configuration by a fusible, chemically degradable or frangible material disposed within the interstices of the coil.

Reference is made in this respect to patent application Ser. No. 870,184, filed today, inventors R. J. T. Clabburn and R. J. Penneck, claiming priority from British Patent Application No. 2832/77 filed Jan. 24, 1977 which describes and claims resiliently recoverable connectors which are held in the dimensionally unstable state by means of disburdenable keepers. As is set out in that application, the disclosures of which are incorporated herein by reference, the disburdenable keeper may, for example, be made from a fusible or heat-softenable material such as a thermoplastic polymer or a low-melting alloy or from a pyrolysable material or from a material which weakens or changes shape when subjected to chemical treatment, including, for example, various plastics materials such as polycarbonates which disintegrate by stress crazing when treated with certain solvents, and other soluble materials. In other cases the keeper may simply be one which can be mechanically broken or dislodged when connection is required. All these materials may be employed to hold out a resilient coil member in accordance with the present invention.

In an especially preferred form of the present invention, the coil member is made of resilient material, e.g. beryllium-copper, and is "held out" in a radially expanded deformed configuration by embedding it in a fusible material, preferably solder, the fusible material being positioned between turns of the coil member. In use the coil member is placed in position about the cable sheath and is then heated. Upon heating the fusible material melts and the resilient coil member is allowed to contract radially and grip the sheath. The use of solder as the fusible material enhances the electrical characteristics of the resultant connection. If desired the fusible material could be replaced by a material which softens or weakens on other treatment, for example a soluble material.

In particular, the present invention provides a heat-recoverable hollow connector which comprises a resilient helical coil member which has been radially expanded from an original configuration to a dimensionally unstable configuration and which is held in the radially expanded configuration by a fusible or heat-softenable material positioned between the interstices of the coil member, the connector being capable of radial contraction when heated to fuse or soften said material.

Preferably the fusible or heat-softenable material is solder, which preferably has a melting point of from 40° to 100° C.

Figure 1C:
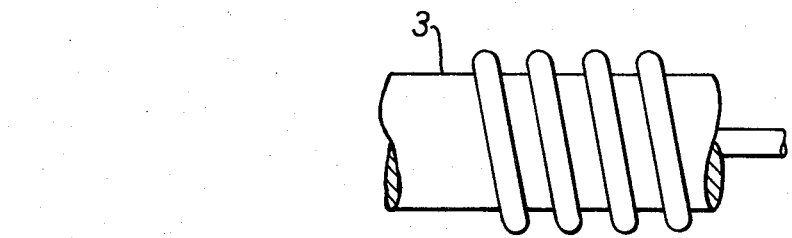
Figure 1D:
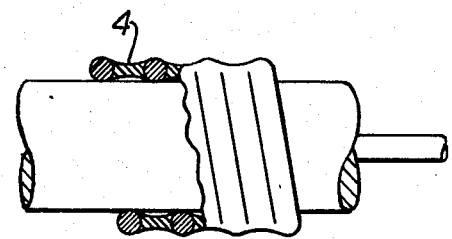
Figure 1E:
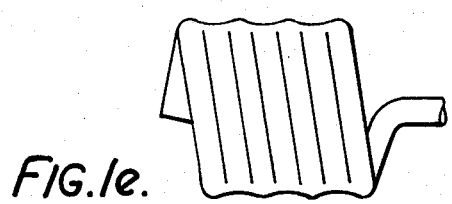

One form of connector, suitable for use in the present invention and the manufacture thereof, will now be described in more detail by way of example only with reference to FIGS. 1*a* to 1*e* of the accompanying drawings which show various stages in the manufacture of the coil member.

A helical coil spring 1, having an earth lead 2 integrally attached thereto, is radially expanded by counter rotating the ends of the coil, and placed on a PTFE mandrel 3. The mandrel, carrying the coil spring, is then dipped in a bath of low melting point solder so that the solder 4 fills the interstices between adjacent turns of the coil. After the solder has cooled the coil is removed from the mandrel, and it is found that the solder prevents the coil from contracting radially.

In use the connector is positioned about a cable sheath and heated to melt the solder, whereupon the coil recovers and firmly grips the cable sheath.

Certain advantages flow from the use of the preferred embodiments of the invention. By using a fusible material positioned in the interstices between adjacent turns of the coil member it is possible to utilise substantially all of the radial recovery of the coil member. The coil member can also, in most cases, be radially expanded to accommodate a wide variety of cable sheath sizes without stressing the material of the coil member beyond its elastic limit. Furthermore, it is found in practice that on recovery individual turns of the coil member tend to adjust themselves independently so as to conform to any minor irregularities in the surface of the cable sheath.

Other variations and modifications falling within the scope of the present invention will be apparent to those skilled in the art.

We claim:

1. A method of forming an electrical connection to an electrical cable comprising the steps of positioning the electrical cable within a helically wound, radially dimensionally-recoverable coil member formed from a heat-recoverable material, the coil member being in a temporarily stable radially expanded configuration, and heating the coil member so that it radially recovers to a smaller radius and grips the electrical cable to form the connection said coil member including an integral lead portion.

2. A method as claimed in claim 1, wherein the coil member is formed from a memory metal.

3. A method as claimed in claim 2, wherein the memory metal is a brass alloy.

4. A method as claimed in claim 1, wherein the connection is made between an earth lead and the sheath of a mineral insulated cable.

5. The method of claim 1 wherein the coil member has fusible material within its interstices, and the step of heating includes melting the fusible material.

6. The method of claim 5 in which the fusible material is solder.

7. A method according to claim 4 wherein said helically wound coil is formed from a memory metal.

8. A method according to claim 7 wherein the earth lead is formed as an integral part of the coil.

9. A method of forming an electrical connection to a substrate comprising the steps of positioning the substrate within a helically wound coil member made from a resilient material and held in a temporarily stable radially expanded configuration by a removable material disposed within the interstices of the coil member, the removable material being different than the resilient material, and causing the coil member to recover to form the connection by removing at least a portion of the removable material from the interstices without damaging the coil member.

10. A method as claimed in claim 9, wherein the resilient material is beryllium copper.

11. The method of claim 9 in which the removable material is a fusible material thus fuses at a temperature lower than the temperature at which the coil member fuses, and the step of causing the coil member to recover comprises heating the fusible material without softening the coil member.

12. A method as claimed in claim 11 wherein the removable material is solder.

13. The method of claim 9 in which the removable material is a chemically degradable material, and the step of causing the coil member to recover comprises chemically degrading the removable material without chemically degrading the coil member.

14. The method of claim 9 in which the removable material is a frangible material that breaks easier than the coil member breaks, and the step of causing the coil member to recover comprises breaking the frangible material without breaking the coil member.

15. A method according to claim 9 wherein the connection is made between an earth lead and the sheath of a mineral insulated cable.

16. A coil member made from resilient material and held in a temporarily stable, radially expanded configuration by a fusible material disposed within the interstices of the coil, the fusible material being different from the coil member material so that it can be softened without softening the coil member whereupon by heating of the fusible material the coil member can radially recover.

17. A coil member as claimed in claim 16, wherein the fusible material is solder.

18. A heat-recoverable hollow connector which comprises a resilient helically wound coil member which has been radially expanded from an original configuration to a dimensionally unstable configuration and which is held in the radially expanded configuration by a fusible or heat-softenable material positioned between the interstices of the coil member, the fusible or heat-softenable material being different from the connector material and softenable at a lower temperature than is the connector material, the connector being capable of radial contraction when heated to fuse or soften said material.

19. A heat-recoverable hollow connector as claimed in claim 18, wherein the fusible material is solder.

20. A heat-recoverable hollow connector as claimed in claim 19, wherein the solder has a melting point of from 40° C. to 100° C.

21. A heat-recoverable hollow connector as claimed in claim 18, wherein the resilient material is beryllium-copper.

22. A helically wound coil member made from resilient material and held in a temporarily stable radially expanded configuration by removable retaining means disposed within the interstices of the coil, the retaining means being of a different material than the resilient material so the retaining means can be removed without damaging the coil member.

23. A helically wound coil member made from resilient material and held in a radially expanded configuration by a chemically degradable material disposed within the interstices of the coil, the chemically degradable material being different from the coil member material so that it can be removed from the interstices without damaging the coil member.

24. A helically wound coil member made from resilient material and held in a radially expanded configuration by a frangible material disposed within the interstices of the coil, the frangible material being different from the coil member material so that it can be broken without breaking the coil member.

* * * * *